United States Patent [19]

Chen

[11] 4,268,150
[45] May 19, 1981

[54] DISPOSABLE CAMERA WITH SIMPLIFIED FILM ADVANCE AND INDICATOR

[76] Inventor: Laurence Chen, 1116 Via Zumaya, Palos Verdes Estates, Calif. 90274

[21] Appl. No.: 115,932

[22] Filed: Jan. 28, 1980

[51] Int. Cl.³ .................. G03B 17/42; G03B 17/36
[52] U.S. Cl. ............................... 354/206; 354/217
[58] Field of Search ............. 354/275, 206, 213, 217, 354/218, 170, 171

[56] References Cited

U.S. PATENT DOCUMENTS

| 461,308 | 10/1891 | Blair et al. | 354/275 X |
| 2,040,018 | 5/1936 | Kilfitt | 354/206 |
| 3,590,711 | 7/1971 | Milanese et al. | 354/213 |
| 3,685,414 | 8/1972 | Good | 354/213 X |
| 3,752,050 | 8/1973 | Wolfe | 354/217 X |
| 3,780,634 | 12/1973 | Van Osch | 354/275 |

Primary Examiner—Donald A. Griffin
Attorney, Agent, or Firm—Willie Krawitz

[57] ABSTRACT

An inexpensive, small size, disposable camera is provided. The camera utilizes a preloaded film and includes a film strip indicator which is driven by the shutter mechanism for display at the front of the camera. A novel film advance mechanism is also provided that obtains a uniform and precise alignment of a film frame which coincides with a film numerical designation using conventional film without requiring a sprocket drive.

8 Claims, 11 Drawing Figures

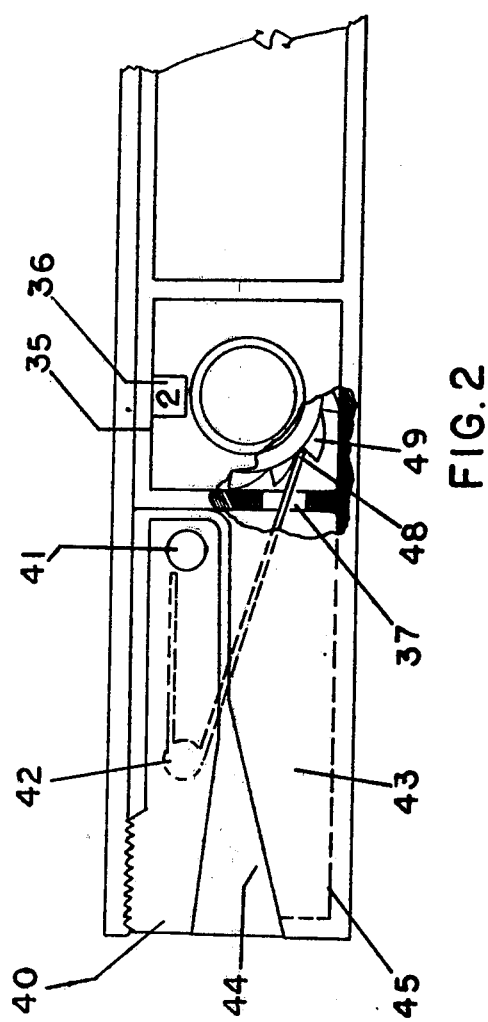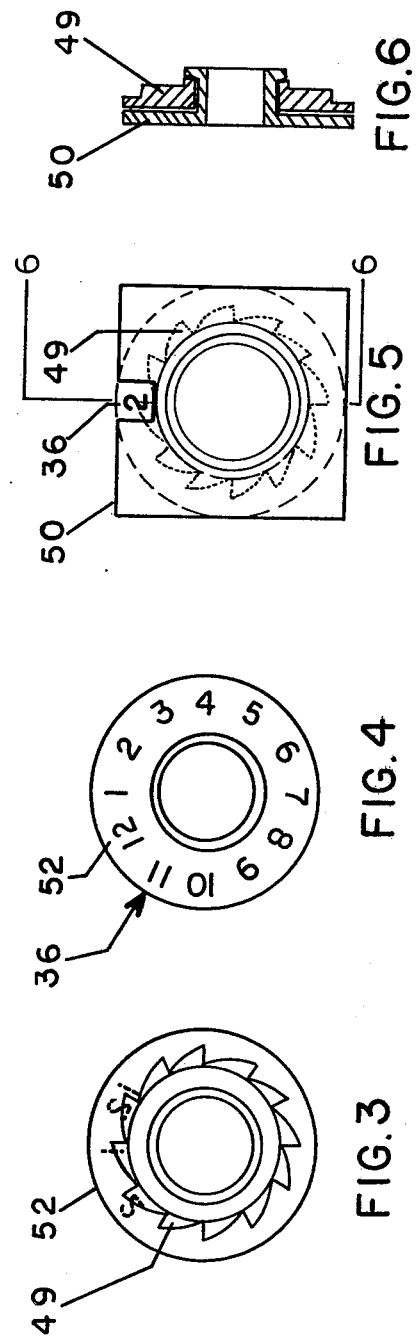

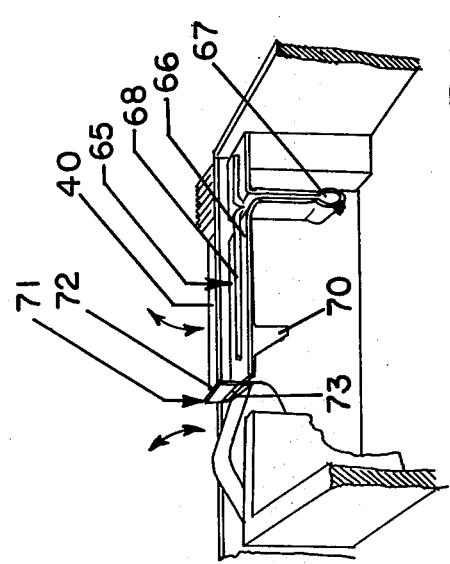
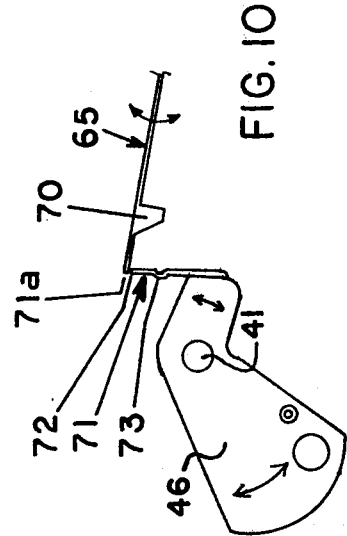
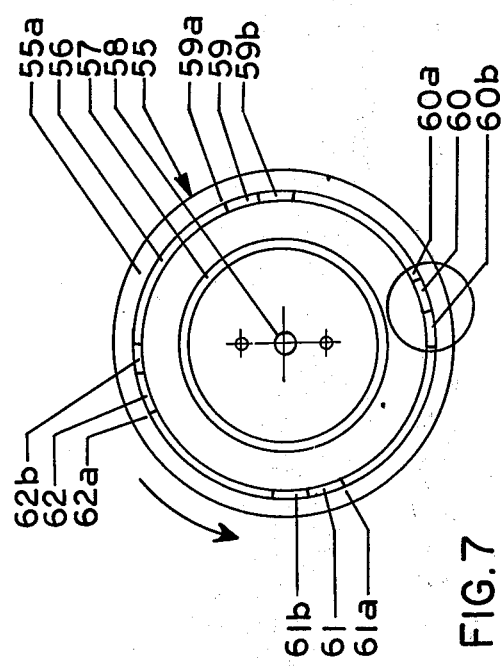
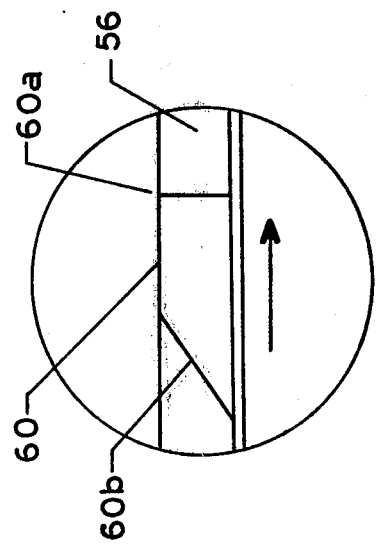

DISPOSABLE CAMERA WITH SIMPLIFIED FILM ADVANCE AND INDICATOR

BACKGROUND OF THE INVENTION

This invention relates to a disposable camera having a new and improved film advance mechanism and film strip indicator.

Expensive varieties of cameras are relatively bulky and somewhat heavy, and in many instances, the quality of pictures is not required or justified by the scene content. Also, in some situations, it might be preferable to use a small size, inexpensive camera. Thus for example, an inexpensive camera could be employed usefully for relatively slow speed photography (e.g. 1/125 sec.); in sunny conditions; in wet, dusty, or grimy weather; when photographic enlargement is not important; or, where an expensive camera could be damaged, etc.

Consequently, inexpensive, disposable cameras have been developed that are of small size, e.g. $4'' \times 2'' \times 1''$, and weigh only a few ounces. One type of disposable camera is disclosed in British Pat. No. 1,342,527 which provides a sprocket film feed and a ratchet driven film indicator. However, this device is complicated and expensive, both in terms of component parts and assembly cost. There is required a disposable camera having a more simplified film feed and indicator which employs inexpensive and reliable components that are easy to assemble and reliable in use; additionally, the camera should be reusable for a few times before it is discarded.

Furthermore, it would be preferable if the mechanism which controls the film advance is separated from the film indicator mechanism itself; this would remove a load from the film advance mechanism and facilitate winding up of the film.

THE INVENTION

According to the invention, there is provided a disposable camera having a spring loaded, rotatable film wind up roll; an end piece mounted on the wind up roll and bearing a circular groove thereon, and a plurality of equidistant stops spaced within the groove; a film supply roll for feeding the wind up roll; a downwardly biased member attached to the camera body and adapted to provide a sliding fit with the groove of the end piece to engage the stops within the grooves and prevent rotation of the film wind up roll when thus engaged; a lens; a shutter; a shutter actuator; a rotatable disc defining a central orifice coinciding with the lens, the disc being driven from the shutter actuator and bearing indicia at its periphery corresponding to the film position; and, a connecting means for engaging the shutter actuator and the downward biased member, whereby actuation of the shutter actuator also incrementally rotates the disc, and release of the shutter actuator causes the connecting means to elevate the downwardly biased member out of contact with the groove of the end piece, thereby releasing the film wind up roll for spring biased advancement until the downwardly biased member engages a succeeding stop in the groove, and re-engages with the connector.

BRIEF DESCRIPTION OF THE DRAWINGS

FIG. 2 is a front elevation view of the camera, partly in section, showing the film advance indicator mechanism;

FIGS. 3 and 4 are rear and front elevation views, respectively, of the film advance indicator;

FIG. 5 is a front elevation view of the film advance indicator mounted in its holder;

FIG. 6 is a view in sectional side elevation of the film advance indicator along lines 6—6 of FIG. 5;

FIG. 7 shows a plan view of the wind up roll top cover;

FIG. 8 is an enlarged view of a portion of a groove in the wind up roll taken from the insert of FIG. 7;

FIG. 9 is a perspective view from the rear of the camera showing the wind up release mechanism;

FIG. 10 shows the release mechanism in detail; and,

DESCRIPTION OF THE PREFERRED EMBODIMENT

Figure 1:
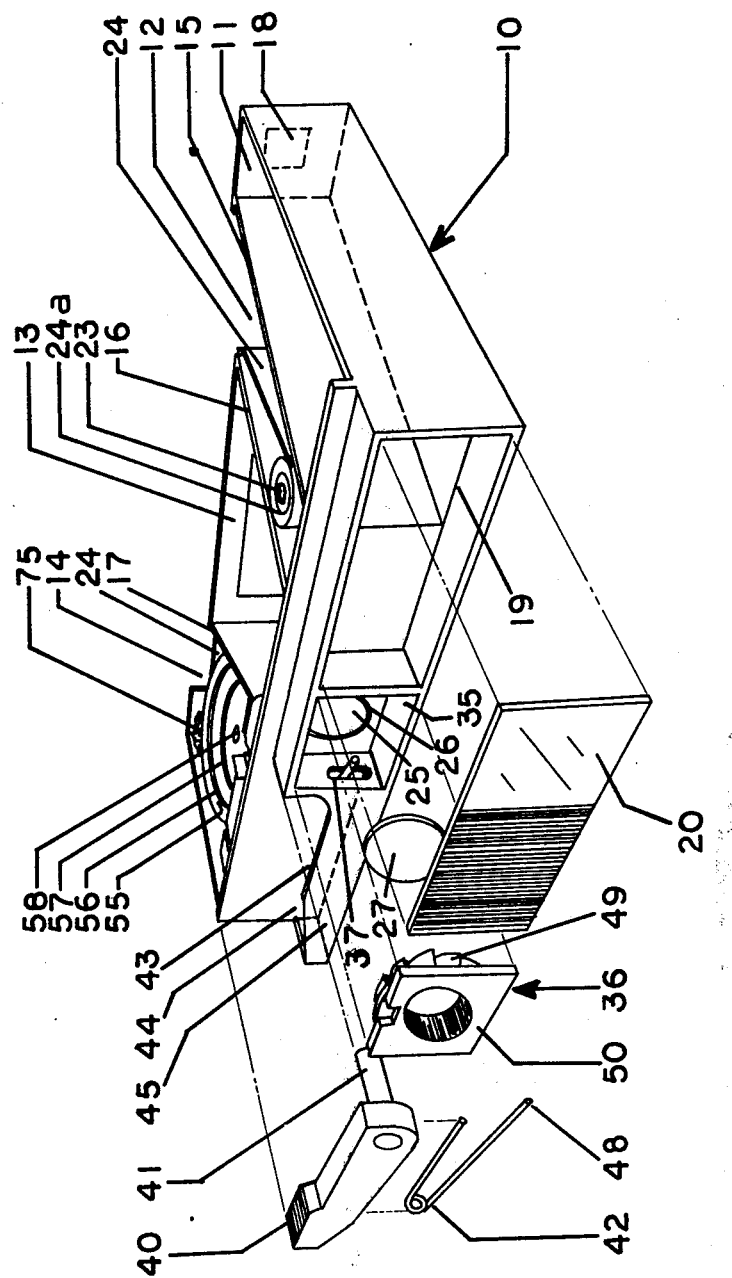
FIG. 1 is a partially exploded, upper perspective view of a camera according to the invention.

The disposable camera of this invention is shown in FIGS. 1, 2, 9 and 11 and comprises a camera body 10 constructed of an injection molded material such as filled polystyrene, and includes a viewing section 11, film supply section 12, photographic section 13 and film wind up section 14. Each of the sections are partitioned off from each other by inner wall portions 15, 16 and 17.

The viewing section 11 includes aligned rear and forward viewer openings 18 and 19, the latter being covered by a transparent plastic 20 to minimize the presence of moisture, dust, etc., from the camera interior. The film supply section 12 includes a rod 23 around which a supply of film 24 is wound up. A hollow bushing 24a is disposed for rotation around the rod 23 to reduce friction during film release. The photographic section 13 at its back end, has an opening through which the image passes onto the film. At its forward end, the photographic section 13 includes a lens opening 25, a circular lens recess 26, and a lens 27 seated in the recess.

Forwardly of the lens is a square shaped frame 35 which retains (by a press fit) a film advance indicator 36 shown separately in FIGS. 3-6. At a lower side of the frame 35 is located a slot 37 through which extends the end of a spring for advancing the film indicator; this will be described in greater detail, infra. A spring loaded shutter lever 40 which also drives the film advance indicator 36, is positioned at the front of the camera. The shutter lever 40 is mounted on a shaft 41 which rotates within the partition wall 17, and the lever 40 is biased upwardly by a spring loading 42. A wall segment 43 is provided to form a recess 44 in which the shutter lever 40 can be moved. A base portion 45 of the recess acts as a stop to limit movement of the shutter lever 40. The shaft 41 is connected to a shutter blade 46 (FIG. 10).

The film advance indicator 36 is rotated by the spring end which functions as a pawl 48 and which extends through the slot 37 in the frame 35. The indicator 36 comprises a ratchet wheel 49 mounted within a holder 50 and is rotated by engagement with the pawl 48. A series of numerical (or letter) designations 52 (FIGS. 3 and 4) are inscribed on the front of the ratchet wheel and with each ratchet. Consequently, a single ratchet movement of the wheel increments the numerical designation, and this will correspond to the advance of a single film frame.

A spring loaded film wind up roll 55 bearing the film 34 is rotatably mounted within the film wind up section 14 of the camera body 10. Two circumferential grooves 56, 57 and a central recess 58 are molded into the top 55a of the wind up roll 55.

Four stops 59, 60, 61 and 62 are positioned within groove 56. Each stop has a vertically inclined leading edge 59a, 60a, 61a and 62a respectively. A vertically movable release 65 is adapted to disengage the wind up roll and enable the film to wind up from rod 23 by actuation of the shutter lever 40. The release 65 comprises a resilient metal sheet 66 attached to the camera body 10 and is biased downwardly at its other end on to the top 55a of the wind up roll 55. A spring 68 secures the release 65 to the camera body and enables the release to be biased into and out of engagement with the film wind up roll. An engagement finger 70 engages the film wind up roll at a leading edge 59a, 60a, 61a, or 62a of a stop. When moved upwardly, the finger 70 will disengage from the stop for a period of time sufficient to enable the spring loading (not shown) to advance the film wind up roll. As the film wind up roll 55 advances, the finger 70 is biased downwardly onto an inclined trailing edge 59b, 60b, etc., and slides off into the groove 56 and into engagement with a succeeding stop. A retaining finger 71 is mounted at one end of the shutter blade 46 and includes a top edge 72, and a shallow indent 73 that contacts the edge 71a of the release 65. When the shutter lever 40 is depressed to open the blade 46, the indent 73 and edge 71a will disengage, and the retaining finger 71 will be biased forwardly under the release 65. When the shutter lever is released, it will be biased upwardly by the spring 42 and cause the top edge 72 to elevate and disengage finger 70 from a stop 59–62; this will permit the film wind up roll to advance. Continued elevation of the shutter causes the retaining finger 71 and release 65 to separate. The edge 71a of the engagement finger will then enter the indent 73 and will prevent oscillation of the engagement finger 70 so that as the film wind up roll advances, the engagement finger has sufficient time to enter the trailing edge 59b, 60b, etc., of a stop and will slide easily into the groove 56. If desired, a sponge 75 of polyurethane or the like may be employed to maintain film alignment as the film is wound up on wind up roll 55.

The advantage of the film advance arrangement of this invention is that a uniform and precise alignment of a film frame is obtained which coincides with the numerical designations 52 of the film advance indicator 36 without requiring a sprocket drive system. Consequently, a conventional film (e.g. a 110 size, albeit for a sprocket drive) can be employed in the camera of this invention and can be processed by conventional techniques and with conventional equipment. This represents a distinct improvement over similar disposable cameras employing a spiral groove arrangement in conjunction with a numerical designation advance system, the latter having the drawback of misaligning a picture frame as the film roll is advanced. As a result, the film must be specially processed because conventional automatic equipment cannot be used to develop a film roll; this of course increases developing costs to the point where it becomes commercially unattractive.

In addition, the present invention transfers actuation of the numerical designation system from the spring loading of the film advance to the shutter lever, and this improves the reliability of the film advance. It will also be observed that the camera of this invention can be recycled following removal of the film, and this improves its profit potential.

Figure 11:
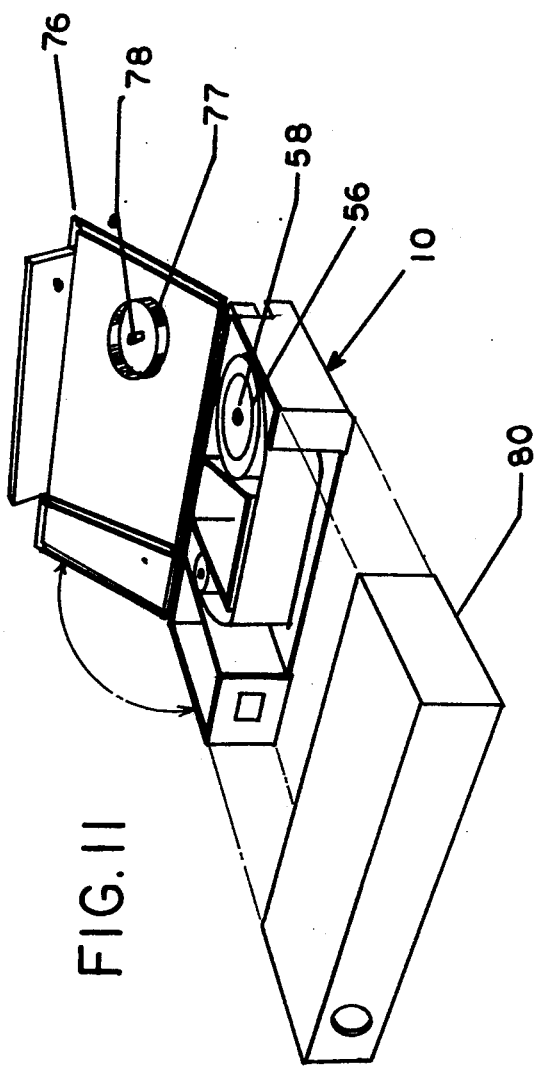
FIG. 11 is an exploded view in perspective showing the interfitting camera, top and cover sleeve.

FIG. 11 illustrates the fitting of a top cover 76 to the camera 10. A raised circular edge 77 and extension pin 78 fit into the corresponding groove 57 and the central recess 58. This aligns the wind up roll 55 and maintains an accurate orientation and spacing between the release 65 and the wind up roll; hence, the engagement finger 70 can be easily biased out of the groove 56. It is preferred to employ a sleeve 80 which fits over the cover 76 and camera body 10; this arrangement enables the film wind up roll to maintain its alignment during film wind up and prevents the wind up roll from being dislodged during use. Also, use of the sleeve 80 functions to prevent light leaks.

I claim:

1. A disposable camera including a spring biased, rotatable film wind up roll; an end piece mounted on the wind up roll and bearing a circular groove thereon, and a plurality of equidistant stops spaced within the groove; a film supply roll for feeding the wind up roll; a downwardly biased member attached to the camera body and including a spring biased sheet with an engagement finger adapted to provide a sliding fit with the groove of the end piece to releasably engage the stops within the grooves and prevent rotation of the film wind up roll when thus engaged; a lens; a shutter; a spring biased shutter actuator, including a retaining finger having a shallow indent, the retaining finger being adapted to elevate the engagement finger out of contact with a groove stop upon release of the shutter until the downwardly biased member engages a succeeding stop in the groove, and continued elevation of the shutter causes the retaining finger and downwardly biased member to separate, and the engagement finger to re-enter the groove and prevent further film windup when the engagement finger contacts a succeeding stop; an edge portion of the downwardly biased member being sized to contact the indent of the retaining finger and stabilize movement of the engagement finger within the groove.

2. The disposable camera of claim 1, in which each stop provides a vertical leading edge for engagement with the downwardly biased member, and a trailing edge having an inclined portion thereby permitting the downwardly biased member to make contact therewith and reenter the groove.

3. The disposable camera of claim 1, including a top cover adapted to fit into the end piece thereby improving alignment of the wind up roll.

4. The disposable camera of claim 1, including a film bushing surrounding the film supply roll, and sponge means disposed between the camera body and the film, thereby improving film alignment.

5. The disposable camera of claim 1, employing a sprocketted film.

6. The disposable camera of claim 1, employing a 110 sprocketted film.

7. The disposable camera of claim 1, including a camera cover adapted to interfit with the end piece, thereby maintaining alignment of the wind up roll during film advancement.

8. The disposable camera of claim 1, including a rotatable disc defining a central orifice coinciding with the lens, the disc being driven from the shutter actuator and bearing indicia at its periphery corresponding to the film position.

* * * * *